US007031950B2

(12) United States Patent
Darken et al.

(10) Patent No.: US 7,031,950 B2
(45) Date of Patent: Apr. 18, 2006

(54) METHOD AND APPARATUS FOR PROVIDING A VIRTUAL AGE ESTIMATION FOR REMAINING LIFETIME PREDICTION OF A SYSTEM USING NEURAL NETWORKS

(75) Inventors: Christian J. Darken, Carmel Valley, CA (US); Markus Loecher, Princeton Jct., NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 353 days.

(21) Appl. No.: 10/017,015

(22) Filed: Dec. 14, 2001

(65) Prior Publication Data

US 2004/0059694 A1 Mar. 25, 2004

Related U.S. Application Data

(60) Provisional application No. 60/255,615, filed on Dec. 14, 2000, provisional application No. 60/255,614, filed on Dec. 14, 2000, provisional application No. 60/255,613, filed on Dec. 14, 2000.

(51) Int. Cl.
*G06F 15/18* (2006.01)

(52) U.S. Cl. .......................................... 706/21; 706/15

(58) Field of Classification Search ............. 706/12–60
See application file for complete search history.

(56) References Cited

U.S. PATENT DOCUMENTS

| | | | | |
|---|---|---|---|---|
| 5,041,976 | A * | 8/1991 | Marko et al. | 701/29 |
| 5,067,099 | A * | 11/1991 | McCown et al. | 702/183 |
| 5,467,355 | A * | 11/1995 | Umeda et al. | 702/184 |
| 5,479,573 | A * | 12/1995 | Keeler et al. | 706/21 |
| 5,729,661 | A * | 3/1998 | Keeler et al. | 706/16 |
| 5,929,267 | A * | 7/1999 | Kadokura | 556/136 |
| 5,943,660 | A * | 8/1999 | Yesildirek et al. | 706/10 |
| 6,424,930 | B1 * | 7/2002 | Wood | 702/184 |
| 6,895,286 | B1 * | 5/2005 | Kaji et al. | 689/28 |

FOREIGN PATENT DOCUMENTS

| | | | |
|---|---|---|---|
| WO | WO 97/49977 | * | 6/1997 |
| WO | WO 02/18879 | * | 8/2000 |

OTHER PUBLICATIONS

Fault Detection of Rotating Machine Parts Using Novel Fuzzy Neural Network; Shigeharu; Daouren Akhmetov and Yasuhiko Dote; 1999, IEEE0-7803-5731-0 pps. 365-369.*

(Continued)

*Primary Examiner*—Anthony Knight
*Assistant Examiner*—Michael B. Holmes
(74) *Attorney, Agent, or Firm*—Michele L. Conover

(57) ABSTRACT

A method for providing a virtual age estimation for predicting the remaining lifetime of a device of a given type, comprises the steps of monitoring a predetermined number of significant parameters of respective ones of a training set of devices of the given type, the parameters contributing respective wear increments, determining coefficients of a radial basis function neural network for modeling the wear increments determined from the training set operated to failure and whereof the respective virtual ages are normalized substantially to a desired norm value, deriving from the radial basis function neural network a formula for virtual age of a device of the given type, and applying the formula to the significant parameters from a further device of the given type for deriving wear increments for the further device.

36 Claims, 2 Drawing Sheets

OTHER PUBLICATIONS

Figure 1:
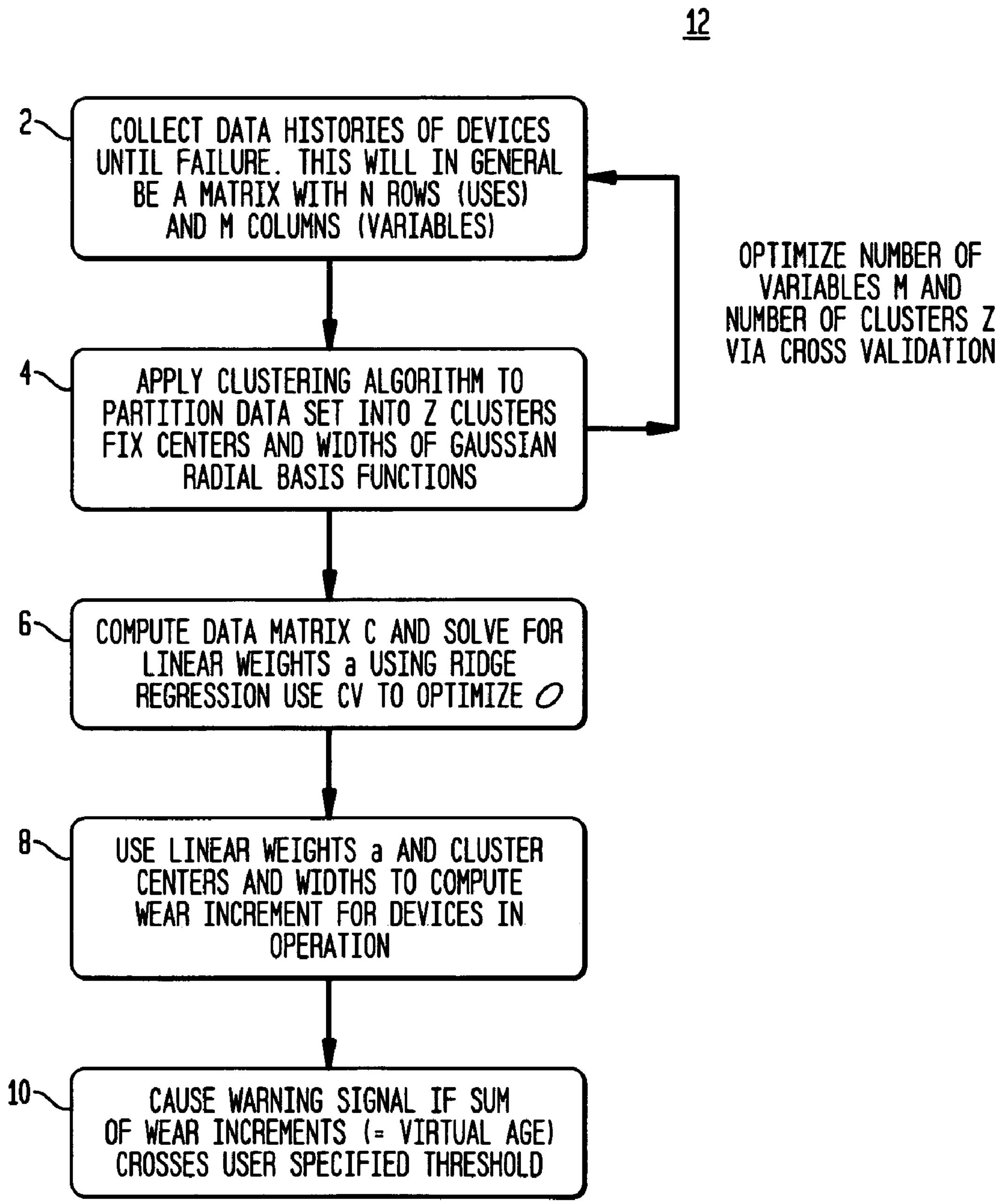

Radial basis function neural networks versus fuzzy models to predict return of consciousness after general anesthesia Nunes, C.S.; Mendonca, T.F.; Amorim, P.; Ferreira, D.A.; Antunes, L.M.; vol. 1, 2004 Page(s):865-868 vol. 2 Digital Object Identifier.*

Assessment of bilharziasis history in outcome prediction of bladder cancer using a radial basis function neural network Ji, W.; Naguib, R.N.G.; Ghoneim, M.; Nov. 9-10, 2000 Page(s):268-271 Digital Object Identifier 10.1109/ITAB. 2000.892399.*

* cited by examiner

METHOD AND APPARATUS FOR PROVIDING A VIRTUAL AGE ESTIMATION FOR REMAINING LIFETIME PREDICTION OF A SYSTEM USING NEURAL NETWORKS

Reference is hereby made to copending:

U.S. Provisional Patent Application No. 60/255,615 filed Dec. 14, 2000 for NEURAL NETWORK-BASED VIRTUAL AGE ESTIMIATION FOR REMAINING LIFETIME, in the names of Christian Darken and Markus Loecher;

U.S. Provisional Patent Application No. 60/255,614 filed Dec. 14, 2000 for POLYNOMIAL BASED VIRTUAL AGE ESTIIMATION FOR REMAINING LIFETIME PREDICTION, in the names of Markus Loecher and Christian Darken; and U.S. Provisional Patent Application No. 60/255,613 filed Dec. 14, 2000 for MARKOV TRANSITION PROBABILITIES FOR PREDICTIVE MAINTENANCE, in the name of Markus Loecher, of which priority is claimed and whereof the disclosures are hereby incorporated herein by reference.

Reference is also made to copending patent applications being filed on even date herewith:

METHOD AND APPARATUS FOR PROVIDING A POLYNOMIAL BASED VIRTUAL AGE ESTIMATION FOR REMAINING LIFETIME PREDICTION OF A SYSTEM, in the names of Markus Loecher and Christian Darken, Ser. No. 10/017,014; and METHOD AND APPARATUS FOR PROVIDING PREDICTIVE MAINTENANCE OF A DEVICE BY USING MARKOV TRANSITION PROBABILITIES, in the name of Markus Loecher, Ser. No. 10/017,013, and whereof the disclosures are hereby incorporated herein by reference.

The present invention relates generally to the field of failure prediction and, more specifically to deriving an estimate of the remaining lifetime of a generic system or apparatus.

Devices and apparatus used in various fields of medicine, industry, transportation, communications, and so forth, typically have a certain useful or operational life, after which replacement, repair, or maintenance is needed. Generally, the expected length of the operational life is known only approximately and, not untypically, premature failure is a possibility. Simple running time criteria are typically inadequate to provide timely indication of an incipient failure. In some applications, unanticipated failure of devices constitutes a at least a nuisance; however, more typically, unanticipated device failure may be a major nuisance leading to costly interruption of services and production. In other cases, such unexpected failure can seriously compromise safety and may result in potentially dangerous and life-threatening situations.

In accordance with an aspect of the invention, a complex function of monitored variables is estimated and then used to compute its "virtual age", which is then compared with a fixed threshold.

In accordance with an aspect of the invention, an approach is utilized for the general task of failure prediction, which is part of a condition based or predictive maintenance.

In accordance with an aspect of the invention, a method of virtual age estimation for remaining lifetime prediction incrementally augments a "virtual age" by continuously monitoring significant parameters of a system throughout at least a portion of its active life.

In accordance with an aspect of the invention, the functional form of the state-dependent virtual age or wear increment is taken to be a radial basis function (RBF) neural network whereof the coefficients are obtained in a training phase.

In accordance with an aspect of the invention, a method for providing a virtual age estimation for predicting the remaining lifetime of a device of a given type, comprises the steps of monitoring a predetermined number of significant parameters of respective ones of a training set of devices of the given type, the parameters contributing respective wear increments, determining coefficients of a radial basis function neural network for modeling the wear increments determined from the training set operated to failure and whereof the respective virtual ages are normalized substantially to a desired norm value, deriving from the radial basis function neural network a formula for virtual age of a device of the given type, and applying the formula to the significant parameters from a further device of the given type for deriving wear increments for the further device.

Figure 2:
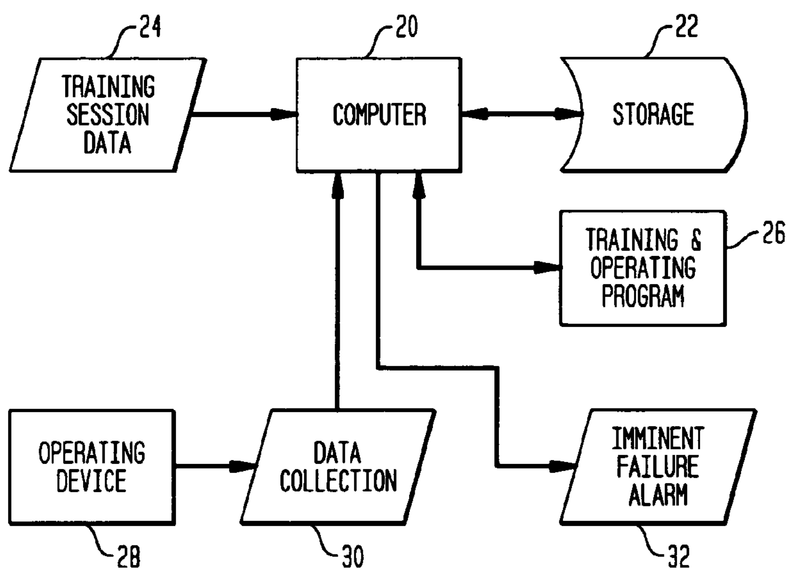

The method will be more fully understood from the following detailed description of preferred embodiments, in conjunction with the Drawing, in which FIG. 1 shows a diagrammatic flow chart of steps in accordance with the principles of the invention; and FIG. 2 shows a block diagram for apparatus in accordance with the principles of the invention.

In FIG. 1, step 2 involves collecting data histories of devices until failure. In general this will conform to a matrix with N rows (uses) and M columns (variables).

In step 4 a clustering algorithm is applied to partition the data set into Z clusters. The centers and widths of Gaussian radial basis functions are fixed.

In step 6 the data matrix C is computed, solving for linear weights a using Ridge regression. Cross validation is used to optimize.

In step 8, linear weights $\alpha$ and cluster centers and widths are used to compute wear increments for devices in operation.

In step 10, the sum of wear increments, that is, the virtual age, is compared with a user specified threshold and if the threshold is exceeded, a warning indication or signal is given.

12 generally indicates the use of cross validation to optimize the number of variables M to be used and the number of clusters.

As shown in FIG. 2, a computer 20 is equipped with data and program storage equipment 22 and a source 26 of programs for training and operating in an interactive manner as hereinafter described. Data from training sessions as further explained below is provided at 24. A device or system 28 which is being monitored provides data by way of data collection interface unit 30 to computer 20. Computer 20 provides an imminent or prospective alarm as to lifetime expiration and/or failure expectation at an alarm device 32.

The method in accordance with the present invention is widely applicable in many fields. In order to facilitate understanding of the invention and to illustrate the use of device-specific information and parameters, the invention will next be more fully described by way of an exemplary, non-limiting embodiment relating to X-ray tubes; where appropriate, generally applicable notions also also stated in the context of the specific exemplary embodiment. The example used is also appropriate in that an unexpected failure of such an X-ray tube, for example during a critical surgical procedure, should be avoided insofar as is possible.

Suppose, $x_n=(x_{1,n} \ldots x_{d,n})$ is a time-series of d-dimensional measurement vectors. The individual scalars $x_i$ could be any quantity affecting the rate of wear or ageing of the device, including directly measured physical quantities such as temperature or voltage or composite functions thereof such as, for example, power (product of voltage and current) or temperature difference, or e.g. control parameters such as load settings and time of operation. The choice of both the number d and kind of variables, which usually is only a small subset of available measurements, can be done following existing variable selection techniques. In the X-ray tube case, it turns out to have been possible to perform an exhaustive search, which selected the d unique scalars that minimized the cross validation (CV) error as will be explained in more detail below.

During the life of the device there will be typically many thousands of vectors, each of which contributes a small increment to the total wear. Without loss of generality, it is herein proposed to reduce the uncertainty in remaining lifetime estimation by the following method:

The wear increment f( ) is modeled by a radial basis function neural network with M hidden units:

$$f(\vec{x}_n) = \sum_{i=0}^{M-1} a_i g(\vec{x}_n, \vec{z}_i, \sigma_i) \quad (1)$$

, where g is a radially-symmetric function centered at $z_i$ with width parameter $\sigma_i$. The number of units M is a free parameter, which again should be optimized by cross validation.

In the case of the X-ray tube, this form was found to be optimal. In general, the normalized form $$f(\vec{x}_n) = \sum_{i=1}^{M} a_i g(\vec{x}_n, \vec{z}_i, \sigma_i) \Big/ \sum_{j=1}^{M} g(\vec{x}_n, \vec{z}_j, \sigma_j)$$

may be used. In either case, the weights $\alpha_1$ enter this equation linearly and hence can be solved for using linear methods, whereas the internal parameters $z_i$ and $\sigma_i$ must be obtained through nonlinear techniques.

For the case of Gaussian basis function, which was found to be appropriate and was used for the X-ray tubes, we have $$g(\vec{x}, \vec{z}, \sigma) = \exp\left(-\frac{\|\vec{x} - \vec{z}\|^2}{2\sigma^2}\right)$$

The $z_i$ can be selected by applying a clustering algorithm, such as k-means, to the measurement vectors. The $\sigma_i$ can be selected in one of several ways, e.g.

- $\sigma_i$ can be taken to be the distance from the i'th measurement to the first (or k'th) nearest measurements. This method was chosen for the X-ray tubes.
- $\sigma_i$ can be taken to be a global constant, e.g. the average of the distance from each measurement to the first (or k'th) nearest measurement.
- In either of the above cases, a scaling factor can be applied. This would introduce another free parameter $\lambda$ ($\sigma_i$ transforms into $\lambda\sigma_i$) to be chosen via cross-validation.

Note that equation (1) can be conveniently rewritten into a sum of M terms of the form $$f(\vec{x}_n) = \sum_{j=0}^{M-1} a_j f_j(\vec{x}_n) \quad (2)$$

, where M is the number of coefficients $\alpha_j$. The dependence on the $z_i$ and the $\sigma_i$ is hidden, as these parameters are fixed through the methods described above. Now we are left with a linear system of equations. We determine the M coefficients $\alpha_j$ in the supervised training phase as follows:

Suppose, there are N device histories of tubes, which eventually failed, indexed by k. This constitutes our training set. Denote the number of vectors for each device by $L_k$. For each device we compute the M independent sums over all wear increments, which naturally depend on the M unknown coefficients:

$$C_{k,j} = \sum_{n=1}^{L_k} f_j(\vec{x}_n^k)$$

This yields a (N×M) matrix $(C)_{k,j}$ and N equations for the virtual age of each device, which have the form $$(VirtualAge)_k = \sum_{j=0}^{M-1} a_j C_{k,j}$$

Ideally, the virtual ages for each device would be identical, say one. In order to find the best weights, such that all virtual ages are as closes as possible to an arbitrary constant (we choose 1), we propose to minimize the sum-of-squared-error criterion function $$J(\vec{a}) = \|\overline{\overline{C}} \cdot \vec{a} - \vec{1}\|^2 + \lambda \vec{a}^T \overline{\overline{B}} \vec{a}$$

The first term on the right side corresponds to the ordinary linear least squares regression. The additional term involving $\lambda$, is intended to improve the generalizability and avoid over fitting. This technique is referred to as ridge regression in the pertinent literature. The parameter $\lambda$ should be optimized via cross validation. The matrix B is positive definite and for the X-ray tubes was taken to be the identity matrix.

In the case of missing data, i.e. if for a particular device z only a fraction $f_k$ of data is available, we have to replace the constant vector 1 with the device dependent vector f:

$$J(\vec{a}) = \|\overline{\overline{C}} \cdot \vec{a} - \vec{f}\|^2 + \lambda \vec{a}^T \overline{\overline{B}} \vec{a}$$

After determining the coefficients a for the N devices in the training set, it is proposed in accordance with the embodiment of the invention to estimate the remaining lifetime of devices in the same family by computing the incremental (and resulting cumulative) wear according to equation (2). Since the virtual age was normalized to one (1), the cumulative wear directly yields the fractional life that has elapsed.

The applicability of the principles of cross correlation in the context of the present invention is next addressed. K-fold cross validation is a well known technique to estimate the test error of a predictor if the available data set (size n) is too small to allow the split into training and test sets. Instead, we iterate the splitting process by dividing the data into a "small" part of k elements and use the remaining n-k elements for training. The test errors on the small k-set are then averaged to yield the k-fold cross validation error. In the X-ray tube example, the data set comprised approximately 70 tubes (n~70) and we chose k~1–5.

It will be understood that the invention may be implemented in a number of ways, utilizing available hardware and software technologies. Implementation by way of a programmable digital computer is suitable, with or without the addition of supplemental apparatus. A dedicated system may also be used, with a dedicated programmed computer and appropriate peripheral equipment. When various functions and subfunctions are implemented in software, subsequent changes and improvements to the operation are readily implemented.

While the present invention has been described by way of illustrative embodiments, it will be understood by one of skill in the art to which it pertains that various changes and modifications may be made without departing from the spirit of the invention. Such changes and modifications are intended to be within the scope of the claims following.

What is claimed is:

1. A method for providing a virtual age estimation for predicting the remaining lifetime of a device of a given type, comprising the steps of:

monitoring a predetermined number of significant parameters of respective ones of a training set of devices of said given type, said parameters contributing respective wear increments;

determining coefficients of a radial basis function neural network for modeling said wear increments from said training set operated to failure and whereof the respective virtual ages are normalized substantially to a desired norm value;

deriving from said radial basis function neural network a formula for virtual age of a device of said given type; and applying said formula to said significant parameters from a further device of the said given type for deriving wear increments for said further device.

2. A method for providing a virtual age estimation as recited in claim 1, including a step of cumulating said further device so as to derive a virtual age estimation for said further device.

3. A method for providing a virtual age estimation as recited in claim 1, including a step of selecting said predetermined number of significant parameters by selecting a number thereof so as to minimize deviations of said virtual ages from said normalized virtual age.

4. A method for providing a virtual age estimation for devices of a given type by predicting the remaining lifetime of a further device of said given type by computing wear increments, comprising the steps of:

collecting data on parameters contributing wear increments in a training set of sample devices until failure, said sample devices being similar to said given device;

modeling a wear increment by a radial basis function neural network;

computing the sum of increments for individual sample devices in said training set to obtain a virtual age therefor, said virtual age being normalized substantially to a convenient normalized virtual age; and determining coefficients of said radial basis function neural network in a supervised training phase of said sample devices in said training set for said normalized virtual age; and deriving incremental wear data for a further device, similar to said sample devices, by utilizing device data for said further device in conjunction with said coefficients of said radial basis function neural network determined in the preceding step.

5. A method for providing a virtual age estimation for devices as recited in claim 4, including a step of cumulating said incremental wear data to derive a virtual age for said further device.

6. A method for providing a virtual age estimation for devices as recited in claim 4, wherein said step of determining coefficients of said radial basis function neural network comprises a step of optimizing said determining by utilizing Ridge regression.

7. A method for providing a virtual age estimation for devices as recited in claim 6, wherein said step utilizing Ridge regression includes a step of optimizing by cross validation between devices in a subset of said training set and the remainder of devices in said training set.

8. A method for providing a virtual age estimation for devices as recited in claim 6, wherein said step of determining coefficients of said radial basis function neural network includes a step of optimizing said coefficients for reducing deviations of said virtual ages from said normalized virtual age.

9. A method for providing a virtual age estimation for devices as recited in claim 6, wherein said step of optimizing said coefficients includes a step of minimizing the sum of least squares of said deviations.

10. A method for providing a virtual age estimation for devices by predicting the remaining lifetime of a given device by computing wear increments, comprising the steps of:

modeling wear increments by a radial basis function neural network based on selected wear parameters which contribute wear increments for said devices;

adjusting coefficients of said radial basis function neural network in accordance with data derived in a training set of such devices for deriving an equation for increments of virtual age for each device in said training set, said virtual ages being normalized substantially to a desired standard value; and applying said equation to said selected wear parameters of a further device similar to devices in said training set for computing wear increments for said further device.

11. A method for providing a virtual age estimation for devices as recited in claim 10, including a step of cumulating said wear increments for said further device for computing a virtual age for said further device.

12. A method for providing a virtual age estimation for devices as recited in claim 10, wherein said step of determining coefficients of said radial basis function neural network comprises a step of optimizing said determining by utilizing Ridge regression.

13. A method for providing a virtual age estimation for devices as recited in claim 12, wherein said step utilizing Ridge regression includes a step of optimizing by cross validation between devices in a subset of said training set and the remainder of devices in said training set.

14. A method for providing a virtual age estimation for devices as recited in claim 10, wherein said step of determining coefficients of said multivariate radial basis function neural network includes a step of optimizing said coefficients for reducing deviations of said virtual ages from said normalized virtual age.

15. A method for providing a virtual age estimation for devices as recited in claim 14, wherein said step of optimizing said coefficients includes a step of minimizing the sum of least squares of said deviations.

16. Apparatus for providing a virtual age estimation for predicting the remaining lifetime of a device of a given type, comprising:

means for monitoring a predetermined number of significant parameters of respective ones of a training set of devices of said given type, said parameters contributing respective wear increments;

means for determining coefficients of a radial basis function neural network for modeling said wear increments determined from said training set operated to failure and whereof the respective virtual ages are normalized substantially to a desired norm value;

means for deriving from said radial basis function neural network a formula for virtual age of a device of said given type; and means for applying said formula to said significant parameters from a further device of the said given type for deriving wear increments for said further device.

17. A method for providing a virtual age estimation for predicting the remaining lifetime of a device comprises the steps of:

monitoring a plurality of significant variable parameters of a device during active operation of said system;

selecting at least a subset of said plurality of significant variable parameters and forming therefrom a series of d-dimensional measurement vectors comprising scalars respectively corresponding to said at least a subset of said significant variable parameters;

deriving respective wear increments corresponding to said scalars;

modeling said wear increments by a radial basis function neural network with M hidden units, wherein M is a free parameter, resulting in a linear system of equations;

determining M coefficients in a supervised training phase involving N histories of devices which failed;

computing for each device the M independent sums over all wear increments, thereby obtaining an (N×M) matrix and N equations for the virtual age of each device; and computing from said (N×M) matrix and N equations a virtual age for each device.

18. A method for providing a virtual age estimation as recited in claim 17, including a step of normalizing said virtual age with respect to a given number.

19. A method for providing a virtual age estimation as recited in claim 17, including a step of normalizing said virtual age with respect to unity.

20. A method for providing a virtual age estimation for predicting the remaining lifetime of a device comprises the steps of:

monitoring a plurality of significant variable parameters of a device during active operation of said system;

selecting at least a subset of said plurality of significant variable parameters and forming therefrom a series of d-dimensional measurement vectors comprising scalars respectively corresponding to said at least a subset of said significant variable parameters;

deriving respective wear increments corresponding to said scalars;

modeling said wear increments by a Gaussian basis function neural network with M hidden units, wherein M is a free parameter, resulting in a linear system of equations;

determining M coefficients in a supervised training phase involving N histories of devices which failed;

computing for each device the M independent sums over all wear increments, thereby obtaining an (N×M) matrix and N equations for the virtual age of each device; and computing from said (N×M) matrix and N equations a virtual age for each device.

21. A method for providing a virtual age estimation as recited in claim 20, including a step of normalizing said virtual age with respect to a given number.

22. A method for providing a virtual age estimation as recited in claim 20 including a step of normalizing said virtual age with respect to unity.

23. A method for providing a virtual age estimation as recited in claim y wherein said step of modeling said wear increments by a Gaussian basis function comprises modeling by a function of the form $$g(\vec{x}, \vec{z}, \sigma) = \exp\left(-\frac{\|\vec{x} - \vec{z}\|^2}{2\sigma^2}\right)$$

wherein $g(\bar{x}, \bar{z}, \sigma)$ represents the Gaussian basis function $\bar{x}$, $\bar{z}$, and $\sigma$ respectively represent.

24. A method for providing a virtual age estimation as recited in claim 23, including a step of selecting the $z_i$ by applying a clustering algorithm to the measurement vectors.

25. A method for providing a virtual age estimation as recited in claim 24, including a step of applying a a scale factor, whereby another free parameter $\lambda$ is introduced, to be chosen via cross-validation, whereby $\sigma_i$ transforms into $\lambda\sigma_i$.

26. A method for providing a virtual age estimation as recited in claim 20, including a step of normalizing said virtual age with respect to a given number.

27. A method for providing a virtual age estimation as recited in claim 20, including a step of normalizing said virtual age with respect to unity.

28. A method for providing a virtual age estimation as recited in claim 24, including a step of deriving $\sigma_i$ by taking $\sigma_i$ be a global constant.

29. A method for providing a virtual age estimation as recited in claim 24, including a step of deriving $\sigma_i$ by taking $\sigma_i$ be the average of the distance from each measurement to the first nearest measurement.

30. A method for providing a virtual age estimation as recited in claim 24, including a step of applying a a scale factor, whereby another free parameter $\lambda$ is introduced, to be chosen via cross-validation, whereby $\sigma_i$ transforms into $\lambda\sigma_i$.

31. A method for providing a virtual age estimation as recited in claim 30 including a step of normalizing said virtual age with respect to a given number.

32. A method for providing a virtual age estimation as recited in claim 31 including a step of normalizing said virtual age with respect to unity.

33. A method for providing a virtual age estimation as recited in claim 29, including a step of deriving $\sigma_i$ by taking $\sigma_i$ be the average of the distance from each measurement to the k'th nearest measurement.

34. A method for providing a virtual age estimation as recited in claim 29, including a step of applying a a scale factor, whereby another free parameter $\lambda$ is introduced, to be chosen via cross-validation, whereby $\sigma_i$ transforms into $\lambda\sigma_i$.

35. A method for providing a virtual age estimation as recited in claim 29, including a step of normalizing said virtual age with respect to a given number.

36. A method for providing a virtual age estimation as recited in claim 29, including a step of normalizing said virtual age with respect to unity.

* * * * *